(12) United States Patent
Kurachi et al.

(10) Patent No.: US 11,695,590 B2
(45) Date of Patent: Jul. 4, 2023

(54) COMMUNICATION DEVICE, COMMUNICATION SYSTEM AND MESSAGE ARBITRATION METHOD

(71) Applicants: NATIONAL UNIVERSITY CORPORATION TOKAI NATIONAL HIGHER EDUCATION AND RESEARCH SYSTEM, Nagoya (JP); AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Ryo Kurachi, Nagoya (JP); Gang Zeng, Nagoya (JP); Hiroaki Takada, Nagoya (JP); Hiroshi Ueda, Yokkaichi (JP)

(73) Assignees: National University Corporation Tokai National Higher Education And Research System, Nagoya (JP); AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 18 days.

(21) Appl. No.: 17/438,909

(22) PCT Filed: Mar. 2, 2020

(86) PCT No.: PCT/JP2020/008587
§ 371 (c)(1),
(2) Date: Sep. 13, 2021

(87) PCT Pub. No.: WO2020/184239
PCT Pub. Date: Sep. 17, 2020

(65) Prior Publication Data
US 2022/0150089 A1 May 12, 2022

(30) Foreign Application Priority Data

Mar. 14, 2019 (JP) ................................. 2019-047478

(51) Int. Cl.
*H04L 12/403* (2006.01)
*H04L 12/40* (2006.01)

(52) U.S. Cl.
CPC .. *H04L 12/403* (2013.01); *H04L 2012/40215* (2013.01)

(58) Field of Classification Search
CPC ...................................................... H04L 12/403
(Continued)

(56) References Cited

U.S. PATENT DOCUMENTS

| 4,434,421 | A | * | 2/1984 | Baker | ........................ H04L 1/14 370/462 |
| 5,675,751 | A | * | 10/1997 | Baker | ................. G06F 13/4027 710/305 |

(Continued)

FOREIGN PATENT DOCUMENTS

| JP | 2005-277896 A | 10/2005 |
| JP | 2008-227741 A | 9/2008 |

(Continued)

OTHER PUBLICATIONS

International Search Report, Application No. PCT/JP2020/008587, dated May 19, 2020. ISA Japan Patent Office.

*Primary Examiner* — Paul R. Myers
(74) *Attorney, Agent, or Firm* — Honigman LLP

(57) ABSTRACT

A communication device that can prevent the transmission of a message from being continuously hindered over a long period of time, a communication system and a message arbitration method are provided. The communication device transmits and receives a message to and from another device connected to a common communication line which com- (Continued)

prises a calculation unit that calculates as to a message to be transmitted a margin time before a time when a transmission of the message is completed; a transmission unit that transmits the message to which information related to the margin time calculated by the calculation unit is attached; and an arbitration unit that performs arbitration based on the information attached to the message when simultaneous message transmissions to the communication line occur, and as to multiple of messages simultaneously transmitted to the communication line, the arbitration unit performs arbitration in such a manner as to prioritize a message with a shorter margin time.

16 Claims, 12 Drawing Sheets

(58) Field of Classification Search
USPC ............................................. 710/110
See application file for complete search history.

(56) References Cited

U.S. PATENT DOCUMENTS

| | | | | |
|---|---|---|---|---|
| 5,887,191 A * | 3/1999 | Adiga | ............... | G06F 13/126 710/36 |
| 6,446,126 B1 * | 9/2002 | Huang | ............... | H04L 47/822 709/224 |
| 6,502,062 B1 * | 12/2002 | Acharya | ............... | G06F 16/24561 702/182 |
| 6,714,554 B1 * | 3/2004 | Jin | ............... | H04L 9/40 370/412 |
| 6,728,749 B1 * | 4/2004 | Richardson | ............... | G06F 9/4887 709/200 |
| 6,791,992 B1 * | 9/2004 | Yun | ............... | H04L 47/564 370/461 |
| 6,802,064 B1 * | 10/2004 | Yao | ............... | G06F 3/0659 710/40 |
| 7,093,256 B2 * | 8/2006 | Bloks | ............... | G06F 9/4887 710/118 |
| 7,577,780 B2 * | 8/2009 | Huang | ............... | G06F 13/362 710/243 |
| 7,739,437 B2 * | 6/2010 | Watabe | ............... | G06F 13/1663 710/244 |
| 7,949,811 B2 * | 5/2011 | Fuehrer | ............... | H04L 12/4015 710/107 |
| 2002/0046328 A1 * | 4/2002 | Okada | ............... | H04N 5/76 710/33 |
| 2002/0157103 A1 * | 10/2002 | Song | ............... | H04N 21/4331 348/E7.071 |
| 2003/0187907 A1 | 10/2003 | Ito | | |
| 2006/0122845 A1 * | 6/2006 | Denford | ............... | G06F 30/20 703/21 |
| 2006/0236300 A1 * | 10/2006 | Lajolo | ............... | G06F 30/30 717/100 |
| 2008/0117810 A1 * | 5/2008 | Stott | ............... | H04L 12/66 370/230 |
| 2008/0235423 A1 * | 9/2008 | Mace | ............... | G06F 13/364 710/113 |
| 2009/0328040 A1 * | 12/2009 | Miller | ............... | G06F 9/54 718/100 |
| 2010/0011182 A1 * | 1/2010 | Le Moal | ............... | G06F 3/0659 711/E12.001 |
| 2012/0300960 A1 * | 11/2012 | Mackay | ............... | H04R 3/00 381/119 |
| 2013/0290970 A1 * | 10/2013 | Shah | ............... | G06F 9/4887 718/102 |
| 2014/0188532 A1 * | 7/2014 | Liu | ............... | G06F 9/5083 705/7.12 |
| 2017/0293587 A1 * | 10/2017 | Yan | ............... | G06F 13/4045 |
| 2018/0131522 A1 | 5/2018 | Lawlis et al. | | |

FOREIGN PATENT DOCUMENTS

| | | |
|---|---|---|
| JP | 2011-218882 A | 11/2011 |
| JP | 2012-123545 A | 6/2012 |

* cited by examiner

COMMUNICATION DEVICE, COMMUNICATION SYSTEM AND MESSAGE ARBITRATION METHOD

CROSS-REFERENCE TO RELATED APPLICATIONS

This application is the U.S. national stage of PCT/JP2020/008587 filed on Mar. 2, 2020, which claims priority of Japanese Patent Application No. JP 2019-047478 filed on Mar. 14, 2019, the contents of which are incorporated herein.

TECHNICAL FIELD

The present disclosure relates to a communication device that transmits and receives messages via a common communication line, a communication system and a message arbitration method.

BACKGROUND

A vehicle is conventionally equipped with multiple devices such as an electronic control unit (ECU) or the like. These multiple devices, which are connected to each other via communication lines, exchange information by transmitting and receiving messages and achieve various functions by cooperative work. The controller area network (CAN) communication standard has been widespread in use for in-vehicle communication.

Japanese Patent Application Laid-Open No. 2005-277896 proposes an on-vehicle network extension apparatus that is expected to efficiently arbitrate communication between communication lines in the case where the CAN communication lines wired in the vehicle are divided into multi-systems. The on-vehicle network extension apparatus is provided with a circuit for arbitrating communication between the communication lines based on priorities attached to messages when a collision occurs between the communication lines.

If message transmissions to a communication line collide with each other in the CAN communication standard, arbitration processing is performed in each of the communication devices. As a result of the arbitration processing, transmission of any one of the messages is allowed while transmission of the rest of the messages is stopped. Which one of the messages is prioritized is decided based on an ID attached to the message. A lower value of the ID of the CAN indicates a higher priority. The ID of the CAN is statically decided at the stage of design or the like of the communication device or the communication system, for example. In the conventional CAN arbitration processing, the transmission of a message with a lower priority tends to continuously be hindered due to the transmission of a message with a higher priority.

The present disclosure is made in view of such circumstances, and the object is to provide a communication device that can prevent the transmission of a message from being continuously hindered over a long period of time, a communication system and a message arbitration method.

SUMMARY

A communication device according to the present aspect is a communication device transmitting and receiving a message to and from another device connected to a common communication line, comprising: a calculation unit that calculates as to a message to be transmitted an margin time before a time when a transmission of the message is to be completed; a transmission unit that transmits the message to which information related to the margin time calculated by the calculation unit is attached; and an arbitration unit that performs arbitration based on the information attached to the message when simultaneous message transmissions to the communication line occur, and as to a plurality of messages simultaneously transmitted to the communication line, the arbitration unit performs arbitration in such a manner as to prioritize a message with a shorter margin time.

The present application can be not only embodied as a communication device having such a characteristic processing unit but also embodied as a message arbitration method executing such characteristic processing in steps and as a computer program causing the computer to execute such steps. In addition, the present application can be embodied as a semiconductor integrated circuit executing a part or all of the communication device or as another device or system including the communication device.

Advantageous Effects

According to the above-description, it is possible to prevent the transmission of a message from being continuously hindered over a long period of time.

DETAILED DESCRIPTION OF PREFERRED EMBODIMENTS

Figure 1:
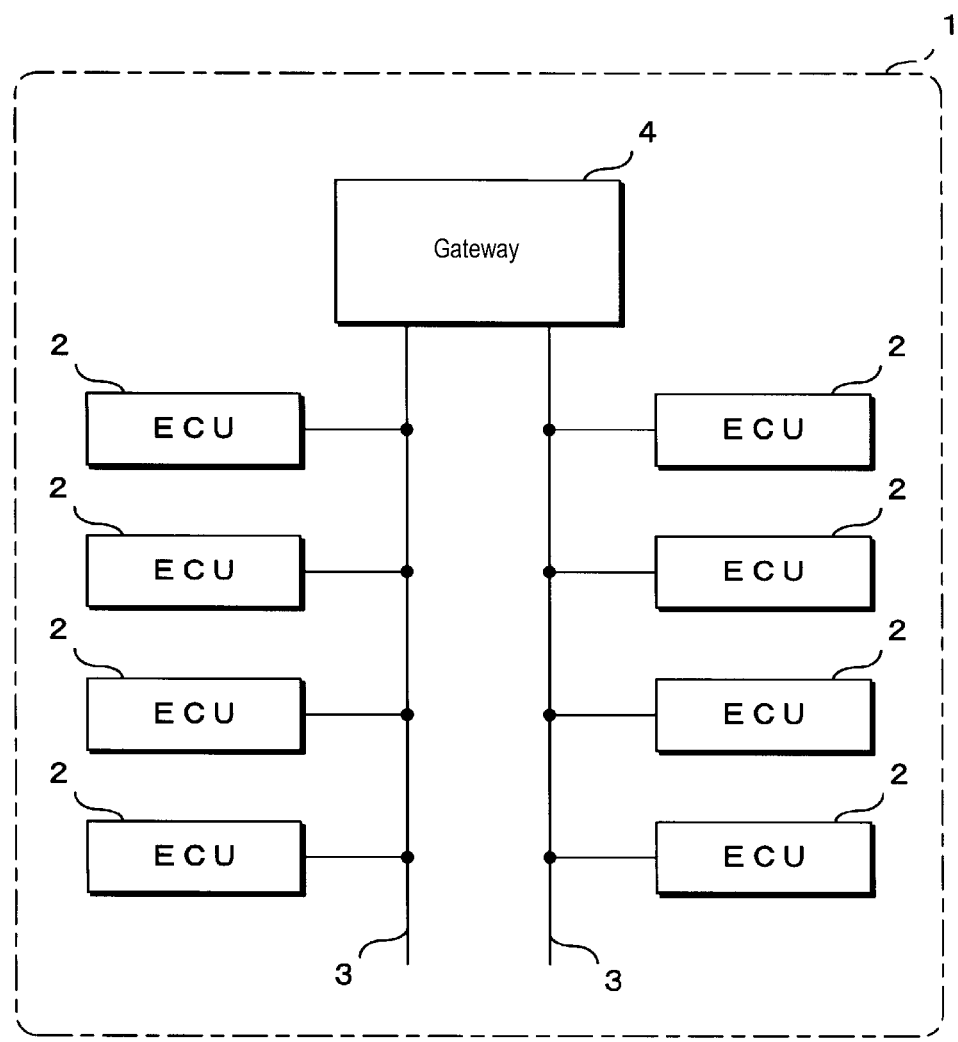
FIG. 1 is a schematic view illustrating the outline of a communication system according to the present embodiment.

Embodiments of the present disclosure are first listed and described. At least parts of the embodiments described below may arbitrarily be combined.

A communication device according to the present aspect is a communication device transmitting and receiving a message to and from another device connected to a common communication line, comprising: a calculation unit that calculates as to a message to be transmitted a margin time before a time when a transmission of the message is to be completed; a transmission unit that transmits the message to which information related to the margin time calculated by the calculation unit is attached; and an arbitration unit that performs arbitration based on the information attached to the message when simultaneous message transmissions to the communication line occur, and as to a plurality of messages simultaneously transmitted to the communication line, the arbitration unit performs arbitration in such a manner as to prioritize a message with a shorter margin time.

In the present aspect, as to a message to be transmitted by the communication device, the communication device calculates a margin time before the time when the transmission of this message is to be completed. The communication device attempts to transmit the message to which information related to the margin time calculated when attempting to transmit the message is attached as information for the arbitration processing. If a message transmission by a communication device of interest and a message transmission by another communication device connected to the common communication line are simultaneously performed and collide with each other, the communication device performs arbitration processing for deciding which one of the message transmissions is prioritized. At this time, the communication device performs arbitration processing in such a manner as to prioritize a transmission of the message with a shorter margin time based on the information on the margin time attached to each of the messages. This enables the arbitration processing while changing the priority depending on the margin time of the message and can prevent a transmission of a specific message from being hindered over a long period of time.

It is preferable that the transmission unit transmits the message to which information related to the margin time calculated by the calculation unit and identification information for identifying a message or identification information for identifying a device are attached.

In the present aspect, the communication device transmits a message to which information related to the margin time of the message and identification information of a message or identification information of a device are attached as information for arbitration. The communication device can perform the arbitration processing based on the identification information even if multiple messages with the same margin time are simultaneously transmitted.

It is preferable that the communication device further comprises a processor and a communication controller that includes the calculation unit, the transmission unit and the arbitration unit and that transmits and receives a message to and from the communication line according to processing performed by the processor, and the communication controller has a storage unit that stores information related to a time when a message transmission is to be completed, and the calculation unit calculates the margin time based on a time point when a transmission request for a message is provided from the processor and the information stored in the storage.

In the present aspect, the communication device is provided with the processor and the communication controller. The communication controller performs transmission and reception of messages according to the processing by the processor as well as performs processing of calculation of a margin time and a message arbitration as described above. The communication controller stores information on a time when a transmission of a message is to be completed. The communication controller calculates a margin time of a message based on the time point when a transmission request for the message is provided from the processor and the time stored in the storage unit. Thus, the processor, an application program executed on the processor or the like needs not to calculate the margin time of a message, perform the arbitration processing and the like.

It is preferable that the message is a message in compliance with a communication standard of the Controller Area Network (CAN), and the transmission unit transmits a CAN message with the information related to the margin time stored in an arbitration field of the CAN message.

In the present aspect, the communication device transmits and receives messages in compliance with the CAN communication standard. The communication device transmits the CAN message with the information related to the calculated margin time stored in the arbitration field of the CAN message. For the CAN communication standard, the arbitration processing is performed, while regarding a message with a lower numerical value stored in the arbitration field as having a higher priority. By storing the information related to the margin time in the arbitration field, the message storing a lower numerical value, that is, the message with a shorter margin time is prioritized.

It is preferable that the communication device further comprises: a relay unit that is connected to a plurality of communication lines and performs processing of transmitting a message received from one of the communication lines to another one of the communication lines; and an obtainment unit that obtains information related to the margin time attached to the message received from the one of the communication lines, the calculation unit calculates a margin time of a message to be relayed based on the information obtained by the obtainment unit.

In the present aspect, the communication device may be connected to a plurality of communication lines and perform processing of transmitting a message received from one of the communication lines to another one of the communication lines. In this case, the communication device obtains the information related to the margin time attached to the message received from the one of the communication lines. If transmitting this message to another communication line for relay, the communication device calculates a margin time of a message to be relayed based on the information obtained by the obtainment unit. For example, the communication device can calculate a margin time of the message to be relayed regarding the margin time based on the obtained information as a time when the message transmission is to be completed. Thus, when a message is relayed to one or multiple devices, processing such as message transmission and arbitration or the like can be performed by propagating the margin time.

It is preferable that the transmission unit transmits a message to which any one of information related to the margin time calculated by the calculation unit and identification information statically decided for the message is selectively attached as information for arbitration performed by the arbitration unit.

In the present aspect, the communication device can selectively perform a transmission of a message to which the information related to the margin time described above is attached and a transmission of a message to which the identification information statically decided is attached. The arbitration by each of the communication devices is made possible by dealing alike both of the information related to the margin time and the identification information statically decided as similar numerical information. The communication device can suitably select which one of the information related to the margin time and the identification information is to be attached to a message for performing a message transmission.

The communication system according to the present aspect is a communication system in which a plurality of communication devices connected to a common communication line transmit and receive messages, each of the communication devices comprising: a calculation unit that calculates as to a message to be transmitted a margin time before a time when a transmission of the message is completed; a transmission unit that transmits the message to which information related to the margin time calculated by the calculation unit is attached; and an arbitration unit that performs arbitration based on the information attached to the message when simultaneous message transmissions to the communication line occur, and as to a plurality of messages simultaneously transmitted to the communication line, the arbitration unit performs arbitration in such a manner as to prioritize a message with a shorter margin time.

In the present aspect, as in the aspect (1), the arbitration processing is made possible while changing the priority depending on the margin time of the message, which can prevent a transmission of a specific message from being continuously hindered over a long period of time.

It is preferable that the transmission unit transmits, if a transmission of a message fails, the message again after a lapse of a predetermined standby time, and a different time is set as the standby time for each of the communication devices.

In the present aspect, if simultaneous transmissions of messages occur by multiple communication devices and the communication device cannot transmit a message as a result of the arbitration processing, it attempts to transmit the message again after a lapse of the predetermined standby time. For the multiple communication devices connected to the common communication line, a different time is set as the standby time before the message is to be transmitted again for each of the communication devices. Thus, even if messages with the same value of the margin time are simultaneously transmitted and are both cannot be transmitted, a timing when a next message is to be transmitted can be differentiated.

It is preferable that the plurality of communication devices include a communication device that provides a message with information related to the margin time as information used for arbitration performed by the arbitration unit, and a communication device that provides a message with identification information statically decided for the message as information used for arbitration performed by the arbitration unit.

In the present aspect, a communication device that transmits a message to which the information related to the margin time is attached may coexist with a communication device that transmits a message to which the identification information statically decided is attached in the communication system.

A message arbitration method according to the present aspect is a message arbitration method performing arbitration when simultaneous message transmissions by a plurality of communication devices connected to a common communication line occur, comprising: by each communication device, calculating as to a message to be transmitted a margin time before a time when a transmission of the message is to be completed, transmitting the message to which information related to the margin time calculated by the calculation unit is attached; and as to a plurality of messages simultaneously transmitted to the communication line, performing arbitration in such a manner as to prioritize a message with a shorter margin time based on the information attached to the message.

In the present aspect, as in the aspect (1), the arbitration processing is made possible while changing the priority depending on the margin time of the message, which can prevent a transmission of a specific message from being continuously hindered over a long period of time.

Specific examples of a communication system according to the embodiments of the present disclosure will be described below with reference to the drawings. The present disclosure is not limited to these examples and is defined by the appended claims, and all changes that fall within the meanings and the bounds of the claims, or equivalence of such meanings and bounds are intended to be embraced by the claims.

Outline of the System FIG. 1 is a schematic view illustrating the outline of a communication system according to the present embodiment. The communication system according to the present embodiment is a system in which multiple ECUs 2 mounted on a vehicle 1 transmit and receive messages in compliance with the CAN communication standard. The multiple ECUs 2 are connected to a CAN bus 3 that is wired in the vehicle 1. About several to several tens of ECUs 2 can be connected to a single CAN bus 3. The vehicle 1 may be equipped with multiple CAN buses 3. In this case, a gateway 4 is mounted on the vehicle 1. The gateway 4, which is connected to multiple CAN buses 3, relays transmission and reception of messages between the multiple CAN buses 3. In the illustrated example, the vehicle 1 is provided with two CAN buses 3. The two CAN buses 3 are connected to the gateway 4. Each of the CAN buses 3 is connected to four ECUs 2. The eight ECUs 2 can mutually transmit and receive messages via the two CAN buses 3 and the one gateway 4. It is noted that the number of ECUs 2, the number of CAN buses 3, the number of gateways 4, the connection manner of the devices and the network configuration and the like that are included in the communication system are not limited to the illustrated ones.

The ECU 2 includes various ECUs, for example, an ECU for controlling an operation of the engine of the vehicle 1, an ECU for controlling locking or unlocking of a door, an ECU for turning on or off of a light, an ECU for controlling the operation of an air bag, an ECU for controlling an antilock brake system (ABS) and the like. Though the examples of the communication device for making communication over the CAN bus 3 include the ECU 2 and the gateway 4 in the present embodiment, the communication device is not limited thereto.

In the message in compliance with the CAN communication standard, identification information called a CAN ID is stored in the top region of a message called an arbitration field. The CAN ID is information indicating the type and so on of data included in the message and indicating the priority of the message. The CAN ID indicates a message with a lower numerical value having a higher priority. If the multiple ECUs 2 simultaneously attempt to transmit messages to the CAN bus 3, arbitration processing based on the value of the CAN ID stored in the arbitration field of each message is performed by each of the ECUs 2 in the CAN communication system. As a result of the arbitration processing, one message having the highest priority is allowed to be transmitted while the transmissions of the rest of the messages need to be held on standby. The CAN ID is a static value decided by a designer at the stage of designing or the like of the vehicle 1, the communication system or the ECU 2.

In the communication system according to the present embodiment, each of the ECUs 2 dynamically changes the value stored in the arbitration field of a message to thereby dynamically change the priority of the message. More specifically, the ECU 2 according to the present embodiment calculates a margin time before the time when the transmission of a message is to be completed and transmits the message with the information related to the calculated margin time stored in the arbitration field of the message. The margin time indicates a shorter margin time as its numerical value is lower. The arbitration processing is performed in compliance with the CAN communication standard, to thereby preferentially transmit a message with a shorter margin time.

Figure 2:
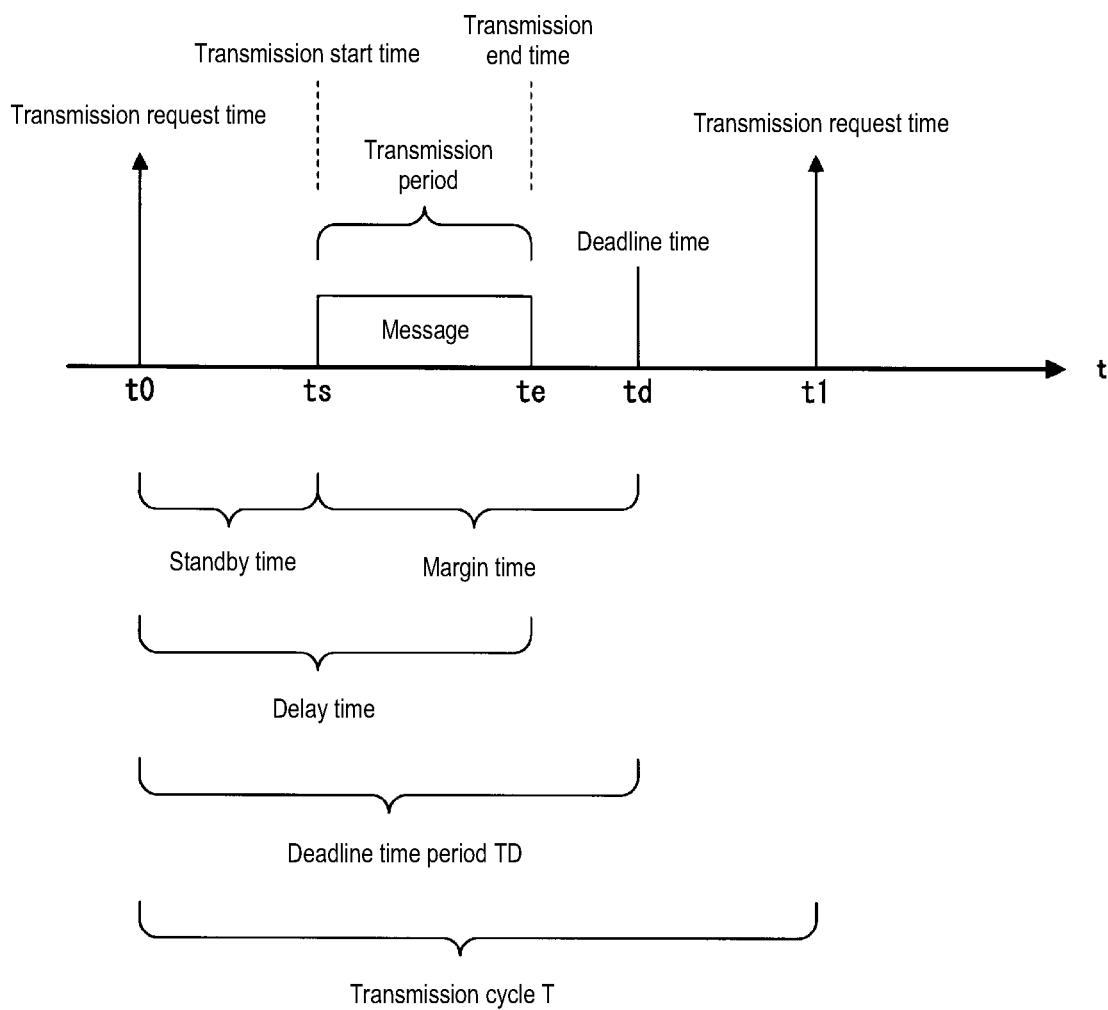
FIG. 2 is a schematic view showing a margin time for a message.

FIG. 2 is a schematic view showing a margin time for a message and shows a timing chart of a message transmission assuming that the horizontal axis is the time t. The ECU 2 according to the present embodiment repeatedly performs a message transmission at a predetermined transmission cycle T, for example. In the illustrated example, the transmission request time of a first message from the ECU 2 is assumed as t0 while the transmission request time of a second message is assumed as t1.

The transmission cycle is T=t1−t0. A time from a transmission request time to a to-be-transmission-completed time is preset for each message as a deadline time period TD. In the illustrated example, a time after a lapse of the deadline time period TD from the transmission request time t0 is assumed as the deadline time td.

Even if one ECU 2 attempts to transmit a message at the transmission request time t0, that ECU 2 may have to wait for a message transmission. This may, for example, occur in a case where another ECU 2 has already performed a message transmission, or a case where another ECU 2 attempts to simultaneously transmit a message so that the ECU 2 of interest fails to obtain the right for a message transmission due to the arbitration processing. In such a situation, the ECU 2 attempts to transmit the message again after a lapse of a predetermined standby time. In the illustrated example, the ECU 2 obtains the right for a message transmission at a transmission start time is after a lapse of a standby time and starts the transmission. The transmission period of a message depends on the data size of the message. In the illustrated example, the ECU 2 ends the transmission of the message at a transmission end time te. The period from the transmission request time t0 to the message transmission end time te corresponds to a delay time of this message.

In the communication system according to the present embodiment, the deadline time period TD is preset for each message transmitted by the ECU 2. The deadline time period TD is a set value that defines a time when the transmission of a message is to be completed from the transmission request time t0 of the message. Assuming that the time obtained by adding the deadline time period TD to the transmission request time t0 is the deadline time td, the transmission end time te of a message needs to be earlier than the deadline time td. Note that the system is placed in operation under the rule that the transmission start time ts may be earlier than the deadline time td. A time equal to or shorter than the transmission cycle T of this message is set for the deadline time period TD.

In the communication system according to the present embodiment, the time from the transmission start time ts of a message to the deadline time td is assumed as a margin time. The ECU 2 calculates the margin time of a message to be transmitted. When obtaining the transmission right of a message at the transmission start time ts, the ECU 2 transmits the message with the calculated margin time stored in the arbitration field of this message. The margin time calculated by the ECU 2 and the margin time stored in the message may be ones obtained by converting real time into a numerical form, although it is represented by a clock number of a clock signal used for the communication processing in the present embodiment. In the case where the clock cycle is 2 μsec and the real time is 500 μsec, for example, the clock number is 250. The information on the clock cycle is shared between the multiple ECUs 2. The information on the margin time stored in the message can be set to the clock number corresponding to the time period from the transmission start time is of a message to the deadline time td as shown in FIG. 2. Alternatively, the clock number corresponding to the time period from the transmission end time to of a message to the deadline time td may be stored in the message.

Each of the ECUs 2 similarly transmits a message with the margin time stored in the arbitration field of the message. The shorter the margin time before the deadline time td is, the lower the numerical value stored in the message is. In the CAN arbitration processing, a message with a lower numerical value stored in the arbitration field of the message is dealt as having a higher priority. In other words, in the communication system according to the present embodiment, a message with a shorter margin time is preferentially transmitted.

Device Configuration

Figure 3:
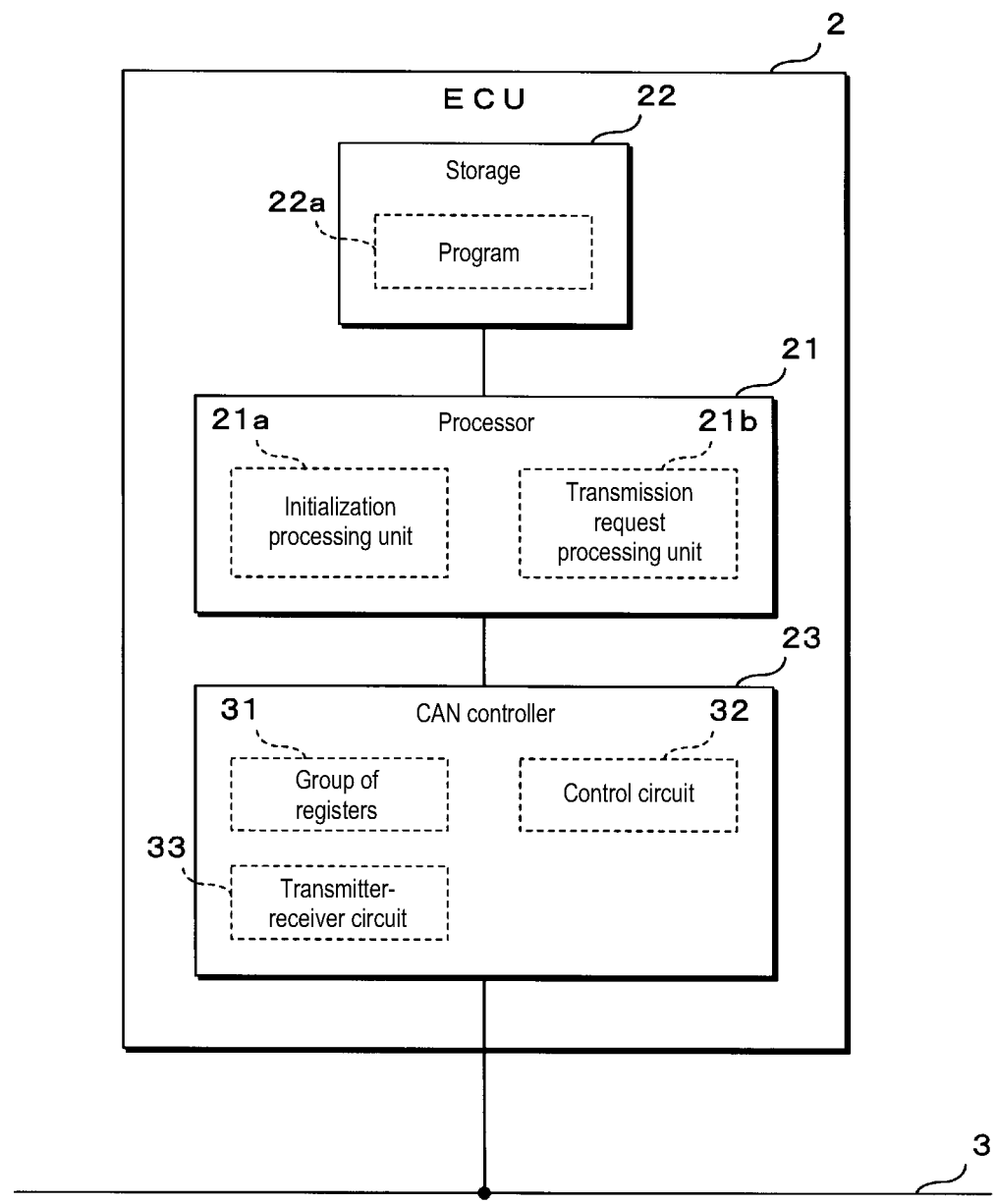
FIG. 3 is a block diagram showing the configuration of an ECU according to the present embodiment.

FIG. 3 is a block diagram showing the configuration of the ECU 2 according to the present embodiment. The ECU 2 according to the present embodiment is composed of a processor 21, a storage 22, a CAN controller 23 and the like. The processor 21 performs various processing such as control processing of the vehicle 1 or the like by reading out and executing a program 22*a* stored in the storage 22. In the present embodiment, if a message transmission to another ECU 2 is needed in the control processing or the like, the processor 21 provides the CAN controller 23 with a message to be transmitted and instructs the transmission of this message.

The storage unit 22 is constituted by using, for example, a nonvolatile memory element such as a flash memory, an electrically erasable programmable read only memory (EEPROM) or the like. The storage 22 stores various programs to be executed by the processor 21 and various data required for the processing by the processor 21. In the present embodiment, the storage 22 stores the program 22*a* to be executed by the processor 21.

The program 22*a* may be written into the storage 22, for example, at the manufacturing stage of the ECU 2. The program 22*a* may, for example, be acquired by the ECU 2 communicating with a remote server device or the like. For example, the program 22*a* recorded in a recording medium such as a memory card, an optical disk or the like may be read out and stored in the storage 22 by the ECU 2. For example, the program 22*a* recorded in the recording medium may be read out and written into the storage 22 of the ECU 2 by a writing device. The program 22*a* may be distributed through a network or may be provided in such a manner as to be recorded in the recording medium.

The CAN controller 23 transmits and receives messages over the CAN bus 3. The CAN controller 23 can be configured as a single integrated circuit (IC), for example.

The CAN controller 23 is connected to another ECU 2, the gateway 4 and the like over the CAN bus 3 wired in the vehicle 1 and makes communication with these on-vehicle devices in compliance with the CAN communication standard. The CAN controller 23 converts a message for transmission that is provided from the processor 21 into an electric signal in compliance with the CAN communication standard and outputs the converted signal to the CAN bus 3 to thereby perform a message transmission to another on-vehicle device. The CAN controller 23 samples and obtains electric potential of the CAN bus 3 to thereby receive a message from another on-vehicle device and provides the processor 21 with the received message.

The CAN controller 23 according to the present embodiment calculates a margin time relative to the deadline time period TD of a message to be transmitted. The CAN controller 23 can transmit a message with the information related to the calculated margin time stored in the arbitration field of the message. If the message transmission performed by an ECU 2 of interest and the message transmission performed by another ECU 2 collide with each other, the CAN controller 23 performs arbitration processing in compliance with the CAN communication standard. This allows the CAN controller 23 to preferentially transmit a message with a shorter margin time. The CAN controller 23 may be configured to be able to perform a message transmission while selectively storing any one of the information related to the margin time described above and the conventional CAN ID in the arbitration field.

In the ECU 2 according to the present embodiment, the processor 21 reads and executes the program 22a stored in the storage 22 to allow the processor 21 to implement an initialization processing unit 21a, a transmission request processing unit 21b and the like as software functional blocks. The initialization processing unit 21a performs initialization processing of the CAN controller 23 when the ECU 2 starts up, for example. The initialization processing may include setting processing of setting a deadline time period for each message, for example. If a message to be transmitted to another ECU 2 occurs in processing such as a travel control of the vehicle 1, for example, the transmission request processing unit 21b performs processing of transmitting this message. The transmission request processing unit 21b generates a message to be transmitted and provides the CAN controller 23 with the message to thereby request for a transmission of this message.

Figure 4:
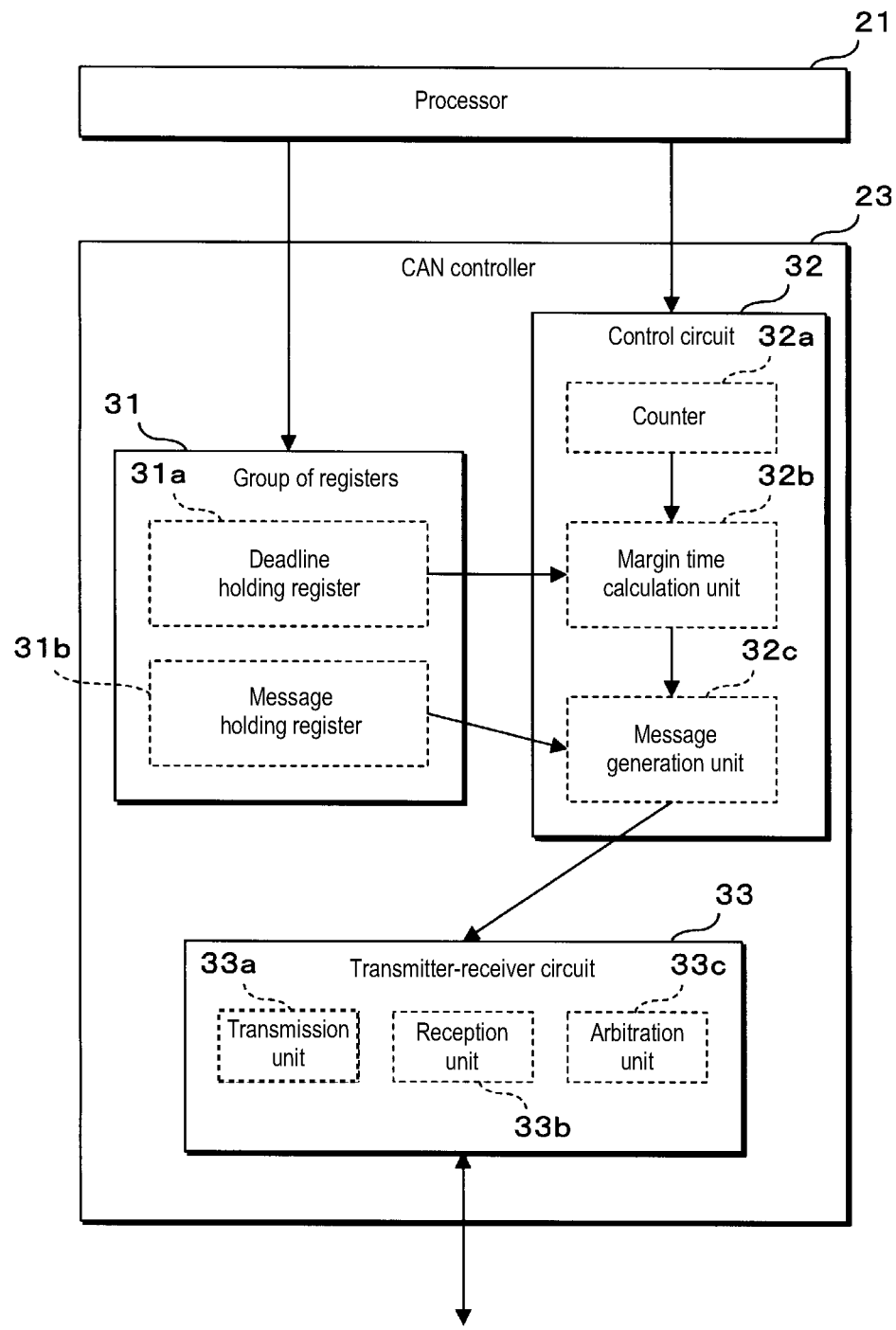
FIG. 4 is a block diagram showing the configuration of a CAN controller according to the present embodiment.

FIG. 4 is a block diagram showing the configuration of the CAN controller 23 according to the present embodiment. FIG. 4 mainly illustrates the functional block related to a message transmission performed by the CAN controller 23 while the functional block related to a message reception is not illustrated.

The CAN controller 23 according to the present embodiment is provided with a group of registers 31, a control circuit 32, a transmitter-receiver circuit 33 and the like. The group of the registers 31 is a storage area used for transmitting and receiving various data between the CAN controller 23 and the processor 21. The group of the registers 31 according to the present embodiment includes a deadline holding register 31a and a message holding register 31b.

The deadline holding register 31a is a register for storing a set value of the deadline time period for a message to be transmitted. If the ECU 2 is likely to transmit multiple types of messages, the group of the registers 31 may include multiple deadline holding registers 31a. The deadline time period is individually set for the identification information attached to a message, i.e., the CAN ID. In the present embodiment, setting of the deadline time period to the deadline holding register 31a is performed by the processor 21 when the ECU 2 starts up, for example. Note that the processor 21 may set the deadline time period every time a message transmission is performed.

The message holding register 31b is a register for storing a message to be transmitted to another ECU 2. In the case where the need for performing a message transmission to another ECU 2 arises, the processor 21 generates a message to be transmitted and stores the message in the message holding register 31b. The message stored in the message holding register 31b by the processor 21 may be a message according to the normal CAN communication standard, that is, the message with the CAN ID stored in the arbitration field. The processor 21 stores the message to be transmitted in the message holding register 31b and provides the control circuit 32 with a transmission instruction to thereby perform a message transmission by the CAN controller 23.

The control circuit 32 of the CAN controller 23 is a circuit for performing control related to the transmission and reception of messages. The control circuit 32 is composed of a counter 32a, a margin time calculation unit 32b, a message generation unit 32c and the like. Assuming that the time point when a transmission instruction of a message is provided from the processor 21 corresponds to 0 hours, the counter 32a measures an elapsed time from this time point. The time measured by the counter 32a corresponds to the standby time as illustrated in FIG. 2. The counter 32a is initialized by a transmission instruction from the processor 21 and counts up in response to a clock signal from the CAN controller 23. The standby time represented by a numerical formula is "(the value of the counter 32a)*(the cycle of clock signals)=(standby time)." The delay time of a message as illustrated in FIG. 2 is a time obtained by adding the transmission time of the message to the standby time. The transmission time of each message can be calculated by the ECU 2 that receives this message. The margin time added to the message may thus be a time obtained by subtracting the standby time from the deadline time period or a time obtained by subtracting the delay time from the deadline time period.

The margin time calculation unit 32b performs processing of calculating a margin time relative to the deadline time period based on the deadline time period held in the deadline holding register 31a and the value of the counter 32a. In the present embodiment, the deadline holding register 31a stores the counter value corresponding to the deadline time period. The margin time calculation unit 32b calculates the margin time by subtracting the value measured by the counter 32a from the value of the deadline holding register 31a. The measurement by the counter 32a and the calculation by the margin time calculation unit 32b are continuously performed before the transmission of this message is completed.

The message generation unit 32c performs processing of generating a message to be actually transmitted to the CAN bus 3 based on the message to be transmitted held in the message holding register 31b and the margin time calculated by the margin time calculation unit 32b. In the present embodiment, the message generation unit 32c generates a message with the margin time calculated by the margin time calculation unit 32b stored in the arbitration field. Here, how to deal with the CAN ID stored in the arbitration field of the message held in the message holding register 31b has some variations, and the details thereof will be described later. The message generation unit 32c provides the transmitter-receiver circuit 33 with the generated message.

The transmitter-receiver circuit 33 of the CAN controller 23 performs transmission and reception of messages to and from the CAN bus 3 and performs arbitration processing when message transmissions collide with each other. The transmitter-receiver circuit 33 is provided with a transmission unit 33a, a reception unit 33b, an arbitration unit 33c and the like. The transmission unit 33a converts a digital message provided from the control circuit 32 into an electric signal in compliance with the CAN communication standard and outputs the converted signal to the CAN bus 3 to thereby transmit a message. The reception unit 33b samples and obtains electric potential of the CAN bus 3 to thereby receive a message transmitted onto the CAN bus 3.

If multiple ECUs 2 simultaneously perform message transmissions to the CAN bus 3, the arbitration unit 33c performs arbitration processing for deciding which message transmission is to be conducted. In the arbitration processing, the message with the lowest numerical value stored in the arbitration field is provided with a right to be transmitted while the other messages are not allowed to be transmitted. In the communication system according to the present embodiment, by using the information on the margin time for the arbitration processing, a communication protocol may be achieved that allows a message with a shorter margin time to be preferentially transmitted. If determining that the ECU of interest is provided with the transmission right by the arbitration unit, the arbitration unit 33c causes the transmission unit 33a to continuously perform the message transmission. If determining that the ECU of interest is not provided with the transmission right, the arbitration unit 33c causes the transmission unit 33a to stop the message transmission. In this case, the arbitration unit 33c notifies the control circuit 32 that the message transmission is stopped according to the arbitration processing. In response to this notification, the control circuit 32 generates a message again by the message generation unit 32c after a lapse of a predetermined standby time and attempts to transmit the message again.

Message Format

As described above, some variations are conceivable in the format of a message that is generated by the CAN controller 23 and transmitted to the CAN bus 3. The three variations that can be employed in the communication system according to the present embodiment will be described below. The employment of the configuration in which a margin time is stored in the arbitration field may cause multiple ECUs 2 simultaneously to transmit messages with the same margin time stored in the respective arbitration fields. A method of identifying multiple messages to which the same margin time is set is required. The following three message formats are variations for achieving this identification.

First Message Format

Figure 5:
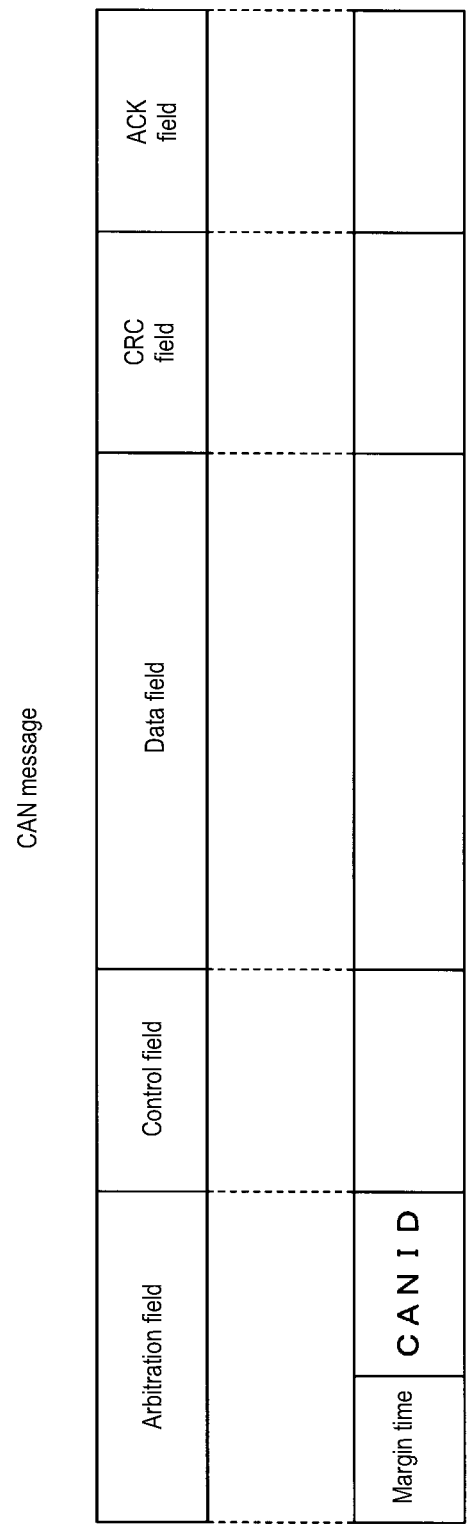
FIG. 5 is a schematic view showing a first message format.

FIG. 5 is a schematic view showing a first message format. A message in compliance with the CAN communication standard includes an arbitration field, a control field, a data field, a cyclic redundancy check (CRC) field, an ACK filed and the like. In the first message format, the margin time and the CAN ID are both stored in the arbitration field. Note that the margin time is stored in the high-order bit side while the CAN ID is stored in the lower-order bit side.

The message generation unit 32c of the CAN controller 23 stores the information related to a margin time calculated by the margin time calculation unit 32b in the upper-order side of the arbitration field of a message to be transmitted. The message generation unit 32c obtains a CAN ID set to the arbitration field of the message stored in the message holding register 31b, that is, the message generated by the processor 21. The message generation unit 32c stores the obtained CAN ID in the lower-order side of the arbitration field of the message to be transmitted. Since the margin time and the CAN ID are stored in the arbitration field in the present embodiment, the arbitration field of a message generated by the message generation unit 32c employs the extended format. The arbitration field of a message stored in the message holding register 31b by the processor 21 employs the standard format.

The arbitration field corresponds to the length of 11 bits in the standard format and 29 bits in the extended format. For the message generated by the message generation unit 32c employing the arbitration field of the extended format, for example, 18 bits are allocated for storing information on the margin time and 11 bits are allocated for storing information on the CAN ID. If the cycle of the clock signal for operating the counter 32a is 2 μsec, the 18 bits can represent the margin time of about 500 msec. The 11 bits of the CAN ID can identify 2047 possible messages.

Note that the bit allocation for the arbitration field is not limited to the above description. If the number of the types of a message is sufficiently small, the bit allocation of the CAN ID is reduced while the bit allocation of the margin time is increased. For example, it is conceivable that 20 bits of the arbitration field are allocated to the margin time while 9 bits thereof are allocated to the CAN ID. In this case, the information of the arbitration field can represent the margin time of about 2 seconds and IDs of 511 possible messages. For example, it is conceivable that 24 bits of the arbitration field are allocated to the margin time while 5 bits thereof are allocated to the CAN ID. In this case, the information of the arbitration field can represent the margin time of about 33 seconds and IDs of 31 possible messages.

Second Message Format

Figure 6:
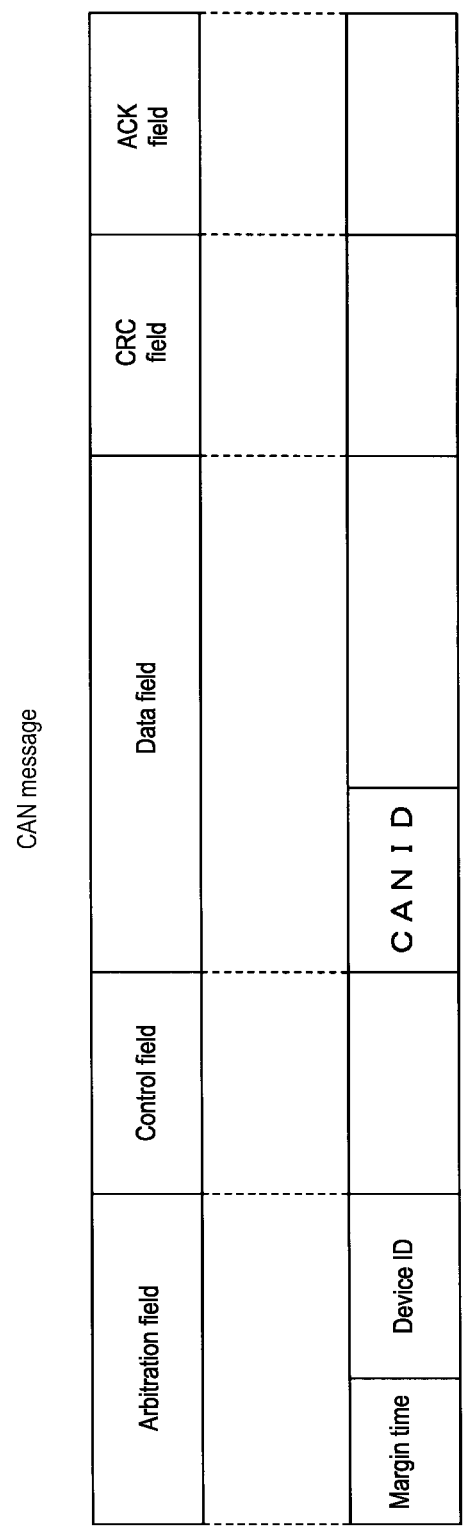
FIG. 6 is a schematic view showing a second message format.

FIG. 6 is a schematic view showing a second message format.

In the second message format, the margin time and the device ID are stored in the arbitration field. The CAN ID is stored in a part of the data field. The device ID is an ID uniquely decided for a device connected to the CAN bus 3 inside the vehicle 1. For example, a register for holding a device ID out of the group of the registers 31 is provided. The processor 21 sets the device ID to this register at the initialization processing. The device ID has been stored in advance in the storage 22, and the processor 21 reads the device ID from the storage 22 at the initialization processing and sets the ID to the group of the registers 31 of the CAN controller 23. Since the CAN ID is stored in the data field of a message in the second message format, the data field needs some free space.

The device ID decided for each device in the vehicle 1 is highly likely to be significantly shorter in length than the CAN ID for identifying the types of messages. For example, 4 bits out of 29 bits of the arbitration field of the extended format are allocated to the device ID to identify 15 devices. In this case, 25 bits are thus allocated to the margin time, which can represent about 67 seconds of the margin time.

Third Message Format

Figure 7:
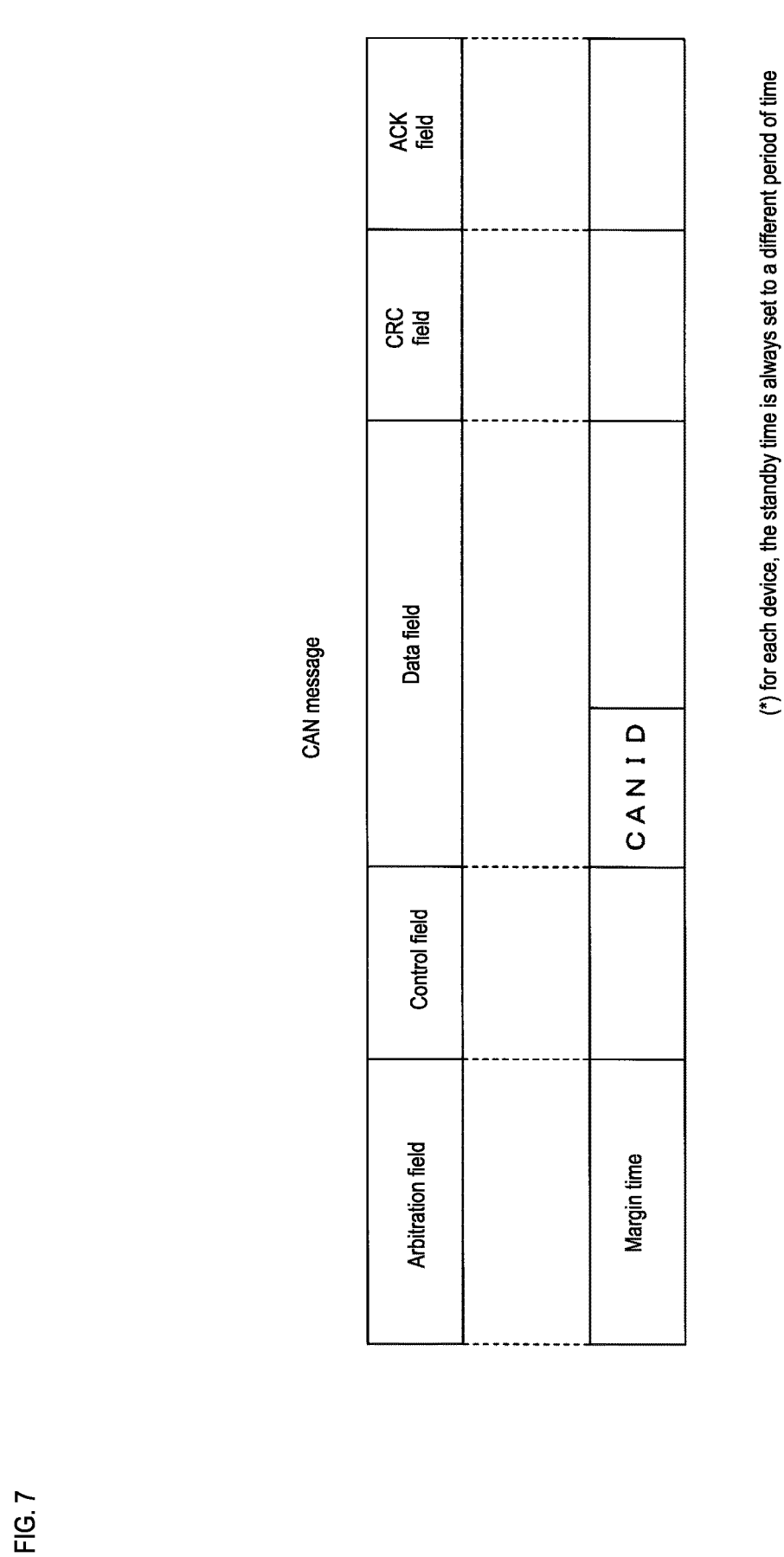
FIG. 7 is a schematic view showing a third message format.

FIG. 7 is a schematic view showing a third message format. In the third message format, only the information related to the margin time is stored in the arbitration field. The CAN ID is stored in the data field. In the case of the third message format, the arbitration field may employ any of the standard format and the extended format. If 11 bits suffice for the margin time, the arbitration field may generally employ the standard format.

In the third message format, in the case where multiple messages to which the same margin time is set are transmitted, it may be determined that the multiple ECUs 2 obtain the transmission right as a result of the arbitration processing. In this case, since the multiple ECUs 2 transmit messages, the message transmissions may be interrupted by an error or the like. If the transmission of the message is interrupted, the ECU 2 attempts to transmit this message again after a lapse of a predetermined standby time. If the third message format is employed, the standby time before each of the ECUs 2 transmits the message again is set to a different period of time. It is noted that for each of the multiple devices connected to a single CAN bus 3, the standby time before the message is transmitted again is always set to a different period of time. Thus, even if the multiple messages to which the same margin time is set are transmitted again as well, collision between them can be prevented.

Setting the standby time for each ECU 2 can be stored in the storage 22. The standby time may, however, be calculated based on the information such as the device ID or the like different for each ECU 2, for example, not necessarily being stored in the storage 22. If the CAN controller 23 counts the standby time, the CAN controller 23 is provided with a register for holding the standby time in the group of the registers 31, and the processor 21 sets the standby time to this register in the initialization processing.

Message Arbitration Method

Figure 8:
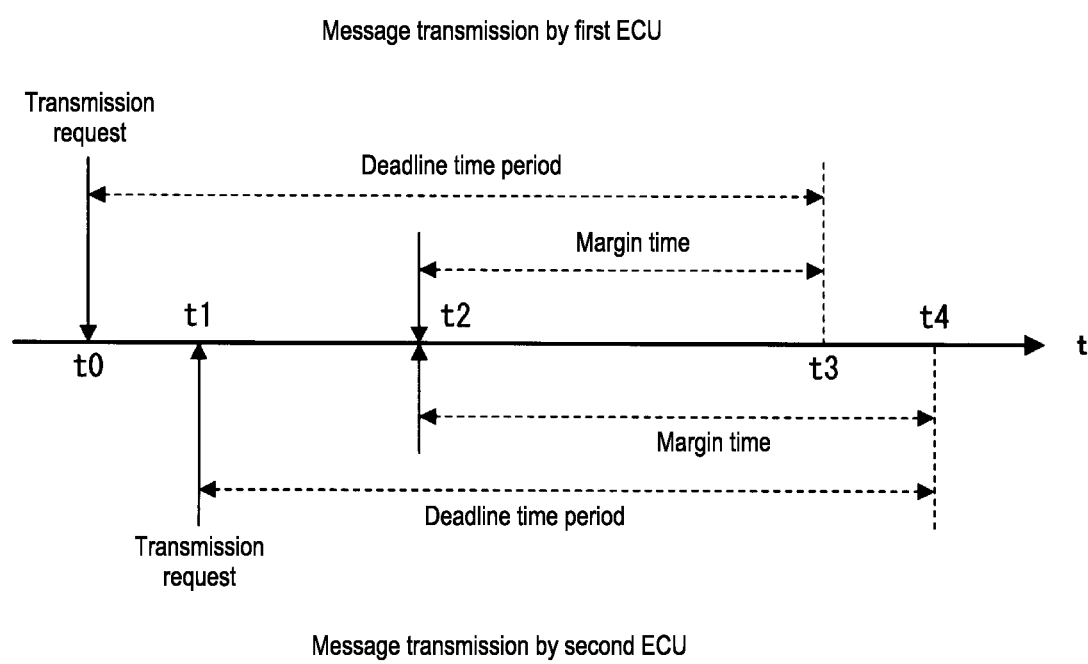
FIG. 8 is a schematic view showing a message arbitration method performed by the communication system according to the present embodiment.

FIG. 8 is a schematic view showing a message arbitration method performed by the communication system according to the present embodiment. The horizontal axis shown by the bold arrow in the drawing is a time axis representing the time t. On the upper side of the time axis, the timing of a message transmission by a first ECU 2 is shown while on the lower side thereof, the timing of a message transmission by a second ECU 2 is shown. In this example, it is assumed that the deadline time period of a message to be transmitted by the first ECU 2 and the deadline time period of a message to be transmitted by the second ECU 2 are the same.

For example, it is assumed that a transmission request for a message is performed from the processor 21 to the CAN controller 23 in the first ECU 2 at the time t0. At this point of time t0, a message transmission by another ECU 2 has been performed on the CAN bus 3, so that the message transmission by the first ECU 2 is held on standby before the end of the transmission by this another ECU 2. Next, it is assumed that a transmission request for a message is performed from the processor 21 to the CAN controller 23 in the second ECU 2 at the point of time t1. At this point of time t1 as well, a message transmission by another ECU 2 has been performed on the CAN bus 3, so that the message transmission by the second ECU 2 is held on standby.

Thereafter, the message transmission by another ECU 2 is completed at the point of time t2, and the first ECU 2 and the second ECU 2 attempt to perform message transmissions. Since the two ECUs 2 simultaneously attempt to perform message transmissions, both of the ECUs 2 perform arbitration processing. Here, the deadline time of the message transmission by the first ECU 2 is assumed as t3 while the deadline time of the message transmission by the second ECU 2 is assumed as t4. In this example, the deadline time t3 comes ahead of the deadline time t4. The margin time attached to the message transmitted by the first ECU 2 at the time t2 is shorter than the margin time attached to the message transmitted by the second ECU 2 at the time t2.

Thus, according to the arbitration processing performed by both of the ECUs 2, the first ECU 2 obtains the transmission right of the message while the second ECU 2 needs to wait for a message transmission. If the message transmission by the first ECU 2 is ended, the second ECU 2 attempts to transmit the message of itself again.

Figure 9:
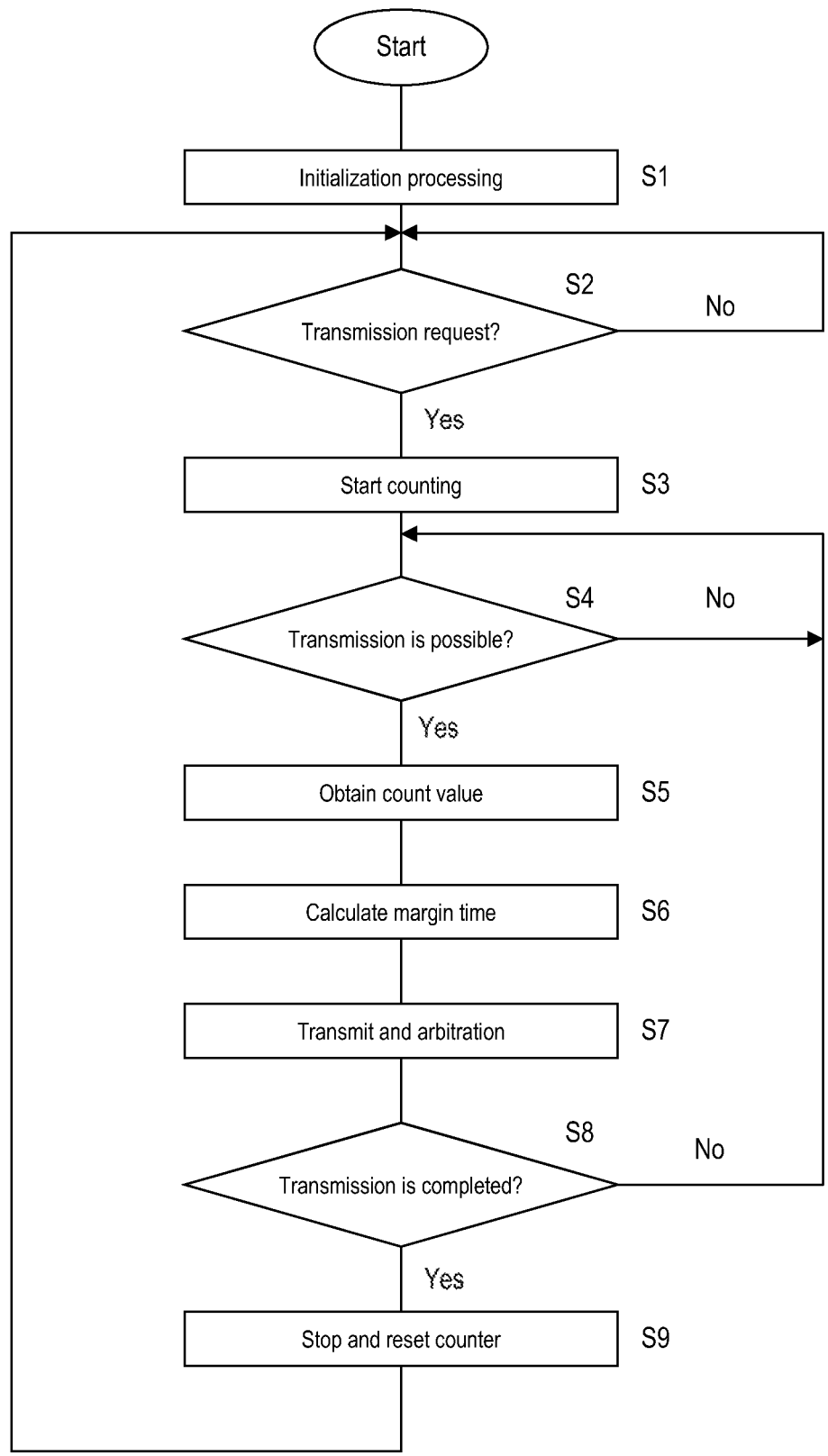
FIG. 9 is a flowchart showing a procedure of message transmission processing performed by the CAN controller of the ECU according to the present embodiment.

FIG. 9 is a flowchart showing a procedure of message transmission processing performed by the CAN controller 23 of the ECU 2 according to the present embodiment. The CAN controller 23 according to the present embodiment performs initialization processing by the processor 21 accepting various set values stored in the group of the registers 31 when the ECU 2 starts up, for example (step S1). After completion of the initialization processing, the CAN controller 23 determines whether or not a transmission request for a message is provided from the processor 21 (step S2). If the transmission request is not provided (S2: NO), the CAN controller 23 is held on standby before a transmission request is provided.

If the transmission request is provided from the processor 21 (S2: YES), the CAN controller 23 starts counting the counter 32a of the control circuit 32 (step S3). Then, the CAN controller 23 determines whether or not a message transmission to the CAN bus 3 is possible (step S4). The CAN controller 23 here determines whether or not a message transmission is possible based on whether or not a message transmission by another ECU 2 has been performed on the CAN bus 3. If the message transmission is not possible (S4: NO), the CAN controller 23 is held on standby before a message transmission is possible.

If the message transmission to the CAN bus 3 is possible (S4: YES), the CAN controller 23 obtains a count value of the counter 32a at this time point (step S5). The margin time calculation unit 32b of the CAN controller 23 calculates a margin time before the completion of the transmission for the message based on the deadline time held in the deadline holding register 31a and the count value obtained at step S5 (step S6). The message generation unit 32c of the CAN controller 23 generates a message with the information on the calculated margin time stored in the arbitration field. The CAN controller 23 attempts to transmit the generated message, and performs arbitration processing if collision with the message transmission by another ECU 2 occurs (step S7).

The CAN controller 23 determines whether or not a message transmission has been completed (step S8). If the message transmission has not been completed, for example, if the transmission right cannot be obtained in the arbitration processing (S8: NO), the CAN controller 23 returns the processing to step S4. If the transmission of the message has been completed (S8: YES), the CAN controller 23 stops counting by the counter 32a to reset it (step S9) and returns the processing to step S2.

Summary

The ECU 2 according to the present embodiment having the above-mentioned configuration calculates as to a message to be transmitted to another ECU 2 a margin time before the time point when the transmission of this message is to be completed (deadline time). The ECU 2 attempts to transmit the message to which the information related to the margin time calculated when attempting to transmit the message as information for the arbitration processing is attached. If the message transmission of the ECU 2 of interest and the message transmission by another ECU 2 that are connected to the CAN bus 3 collide with each other, the ECU 2 of interest performs arbitration processing for deciding which one of the message transmissions is prioritized. The ECU 2 performs the arbitration processing in such a manner as to prioritize a transmission of the message with a shorter margin time based on the information on the margin time attached to each of the messages. Thus, the communication system enables the arbitration processing while changing the priority depending on the margin time of the message and can prevent a transmission of a specific message from being hindered over a long period of time.

The ECU 2 according to the present embodiment provides a message to which the information related to the margin time of the message and the identification information such as the CAN ID, the device ID or the like are attached as information for the arbitration processing. Thus, the ECU 2 can perform the arbitration processing based on the identification information even if multiple messages with the margin time of the same value are simultaneously transmitted.

If the ECU 2 according to the present embodiment cannot transmit a message due to simultaneous transmissions of messages by multiple ECUs 2, it attempts to transmit the message again after a lapse of a predetermined standby time. For the multiple ECUs 2 connected to the CAN bus 3, a different time period is set as a standby time before the message is transmitted again for each of the ECUs 2. Thus, even if messages with the same value of the margin time are simultaneously transmitted but cannot be transmitted, a timing when the message is to be transmitted again can be differentiated.

The ECU 2 according to the present embodiment is provided with the processor 21 and the CAN controller 23. The CAN controller 23 performs transmission and reception of messages according to the processing by the processor 21 as well as performs calculation of a margin time, an arbitration processing and the like as described above. The CAN controller 23 stores information on a time period during which a transmission of a message is to be completed, that is, a deadline time period in the group of the registers 31. The CAN controller 23 calculates a margin time of a message based on the time point when a transmission request for the message is provided from the processor 21 and the deadline time period stored in the group of the registers 31. Thus, the processor 21, the program 22a executed on the processor 21 and the like need not to perform calculation of the margin time of a message, the arbitration processing and the like.

The ECU 2 according to the present embodiment transmits and receives messages in compliance with the CAN communication standard. The ECU 2 stores the information related to the calculated margin time in the arbitration field of the CAN message.

According to the CAN communication standard, the arbitration processing is performed, while regarding a message with a lower numerical value stored in the arbitration field as having a higher priority. By storing the information related to the margin time in the arbitration field, the message storing a lower numerical value, that is, the message with a shorter margin time is prioritized.

Though the communication system mounted on the vehicle 1 is described as an example in the present embodiment, the application of this technique is not limited to the on-vehicle communication system. The communication system with a similar configuration may be mounted on a mobile body such as a ship, an airplane or the like. A similar configuration may be adopted for the communication system installed in a factory, an office or the like. Though the communication system according to the present embodiment transmits and receives messages in compliance with the CAN communication standard, any communication standard except for the CAN communication standard may be employed. The communication standard employed for the communication system is not limited to be intended for a bus network configuration, but may be intended for various network configurations such as a star network configuration and a peer to peer network configuration, for example.

The role of each of the processor 21 and the CAN controller 23 mounted on the ECU 2 according to the present embodiment is not limited to the above-described ones. For example, the processor 21 may calculate the margin time. The ECU 2 may not necessarily have the processor 21 and the controller 23 separately, but may be provided with a processor incorporating the CAN controller 23 therein.

The CAN controller 23 according to the present embodiment measures a time by counting up of the counter 32a and calculates a margin time by subtracting the measured time from the deadline time period held in the deadline holding register 31a. The CAN controller 23, however, may set the deadline time period as an initial value of the counter 32a and obtain a margin time by counting down of the counter 32a.

Modification 1

For the communication system according to Modification 1, an ECU 2 that transmits a message with the margin time stored in the arbitration field as described above may coexist with a conventional ECU 2 that transmits a message with the CAN ID stored in the arbitration field. Regardless of which one of the information of the margin time or the CAN ID is stored in the arbitration field, the CAN controller 23 performs the arbitration processing by handling these information as mere binary digital information. The CAN controller 23 may prioritize a lower numerical value of the digital information stored in the arbitration field.

Modification 2

For the CAN controller 23 of the ECU 2 according to Modification 2, the processor 21 can select which one of the margin time and the CAN ID is to be used for the information to be stored in the arbitration field. The group of the registers 31 of the CAN controller 23 according to Modification 2 includes a register for setting selection as to which one of a margin time and a CAN ID is to be attached to a message. The processor 21 performs setting of the register to provide the CAN controller 23 with a transmission request for a message. The CAN controller 23 stores any one of the margin time and the CAN ID in the arbitration field according to the setting performed on the register and transmits this message.

As shown in Modification 1 and Modification 2, in the communication system according to the present embodiment, the transmission of a message storing the margin time in the arbitration field may coexist with the transmission of a conventional formatted message storing the CAN ID in the arbitration field. Thus, the arbitration processing based on the margin time can be introduced to only a part of the ECUs 2 included in the existing communication system.

In Modification 1 and Modification 2, the ECU 2 may use the arbitration field of the standard format if storing the CAN ID and may use the arbitration field of the extended format if storing the margin time. In this case, a message with the arbitration field of the standard format may be prioritized in the arbitration processing.

Embodiment

Figure 10:
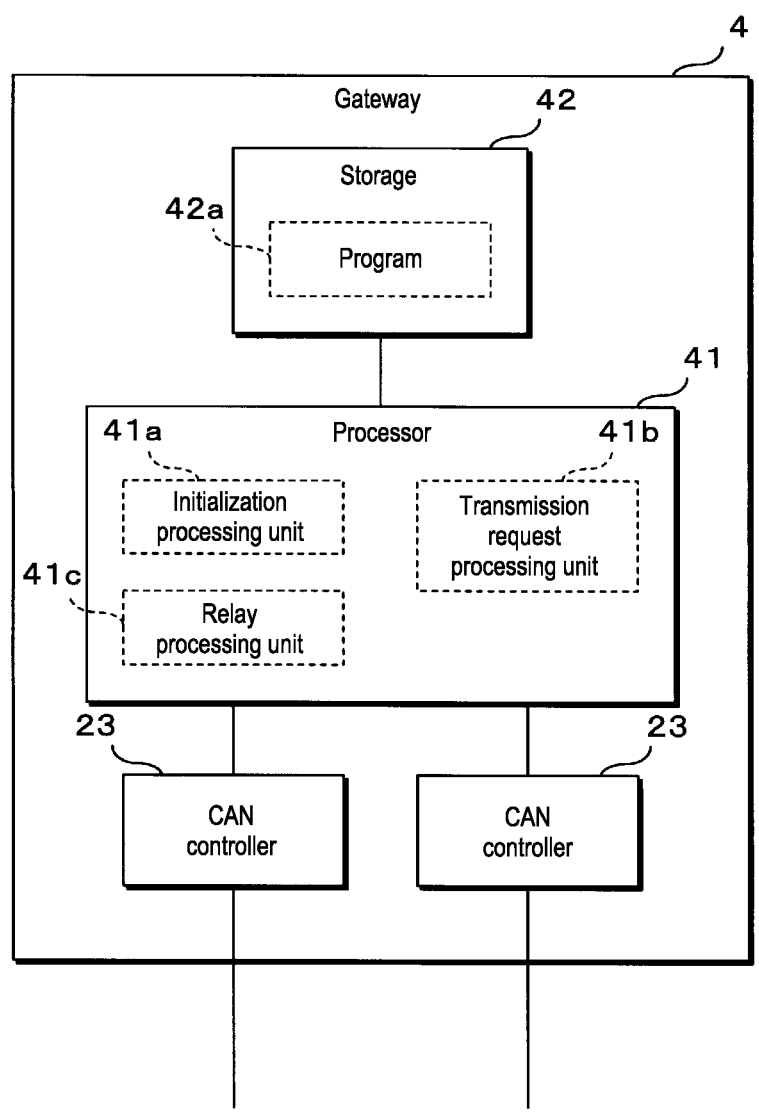
FIG. 10 is a block diagram showing the configuration of a gateway according to Embodiment 2.

Embodiment 2 relates to a gateway 4 that relays transmission and reception of a message between multiple CAN buses 3. Taking the margin time attached to a message received from one CAN bus 3 into account, the gateway 4 according to Embodiment 2 calculates a margin time of a message that is to be relayed and transmitted to another CAN bus 3. FIG. 10 is a block diagram showing the configuration of the gateway 4 according to Embodiment 2. The gateway 4 according to Embodiment 2 is composed of a processor 41, a storage 42, multiple CAN controllers 23 and the like.

The processor 41 performs various processing such as relaying a message between the multiple CAN buses 3 or the like by reading and executing a program 42*a* stored in the storage 42. The storage 42 is constituted by using, for example, a nonvolatile memory element such as a flash memory or, an EEPROM or the like. The storage 42 stores various data including the program 42*a* to be executed by the processor 41.

The program 42*a* may be written into the storage 42, for example, at the manufacturing stage of the gateway 4. For example, the program 42*a* may be acquired by the gateway 4 communicating with a remote server device or the like. For example, the program 42*a* recorded in a recording medium such as a memory card, an optical disk or the like may be read out and stored in the storage 42 by the gateway 4. For example, the program 42*a* recorded in the recording medium may be read out and written into the storage 42 of the gateway 4 by a writing device. The program 42*a* may be distributed through a network or may be provided in such a manner as to be recorded in the recording medium.

The gateway 4 according to Embodiment 2 is provided with two CAN controllers 23. The gateway 4 may however be provided with three or more CAN controllers 23. The CAN controllers 23 are connected to respective CAN buses 3, and transmit and receive messages over the CAN buses 3. The CAN controller 23 may be the same as the CAN controller 23 mounted on the ECU 2. The CAN controller 23 converts a message for transmission that is provided from the processor 41 into an electric signal in compliance with the CAN communication standard and outputs the converted signal to the CAN bus 3 to thereby perform a message transmission to another on-vehicle device. The CAN controller 23 samples and obtains electric potential of the CAN bus 3 to thereby receive a message from another on-vehicle device and provides the processor 41 with the received message.

In the gateway 4 according to Embodiment 2, the processor 41 reads out and executes the program 42*a* stored in the storage 42 to thereby implement an initialization processing unit 41*a*, a transmission request processing unit 41*b*, a relay processing unit 41*c* and the like as software functional blocks. The initialization processing unit 41*a* performs initialization processing of the CAN controller 23 when the gateway 4 starts up, for example. The transmission request processing unit 41*b* generates a message to be transmitted and provides the CAN controller 23 with the message to thereby request for transmission of the message. The relay processing unit 41*c* performs processing of transmitting a message received from one of the CAN controllers 23 to another one of the CAN controllers 23. When relaying a message, the gateway 4 according to Embodiment 2 propagates the margin time and the deadline time period for this message.

Figure 11:
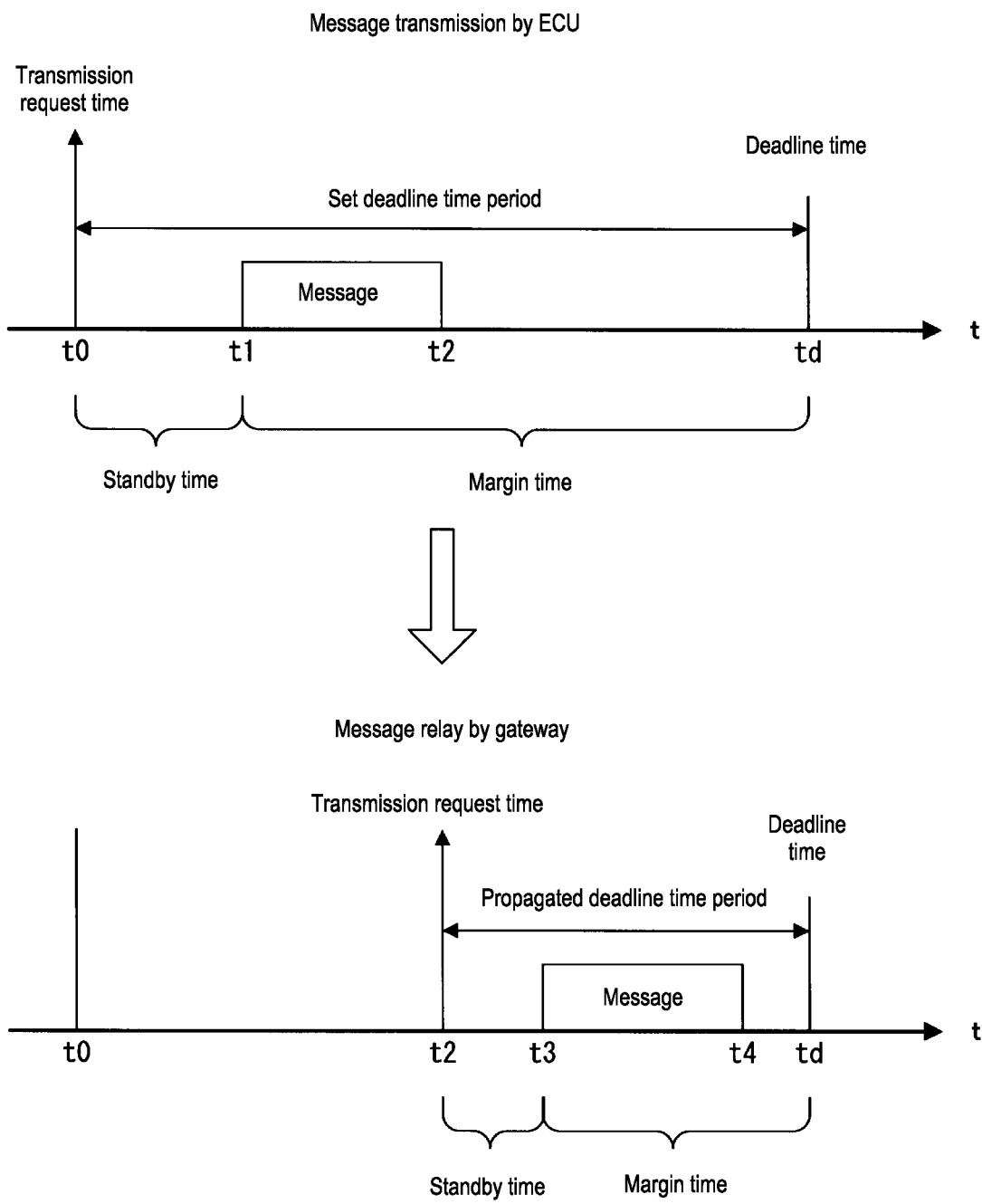
FIG. 11 is a schematic view showing propagation of the margin time and the deadline time for a message.

FIG. 11 is a schematic view showing propagation of the margin time and the deadline time period for a message. At the top part in FIG. 11, a timing chart obtained when the ECU 2 first transmits a message is shown. The deadline time td is the time point after a lapse of a set deadline time period from the transmission request time t0 when a transmission request for a message is provided from the processor 21 of the ECU 2 to the CAN controller 23. In this example, a message transmission is performed at the time t1 when some standby time has elapsed from the transmission request time to. This message transmission is completed at the time t2 after a lapse of a predetermined transmission time that depends on the message length. At this time, the margin time stored in the arbitration field of the message is a time period from the time t1 to the deadline time td.

At the bottom part in FIG. 11, a timing chart obtained when the gateway 4 relays a message is shown. The gateway 4 performs a message relay between two CAN buses 3 by receiving a message transmitted by the ECU 2 connected to one of the CAN buses 3 and transmitting the message to another one of the CAN buses 3. The gateway 4 obtains the margin time stored in the arbitration field of the received message. The gateway 4 calculates a time period by subtracting the transmission time of this message and the time required for the internal processing by the gateway 4 from the obtained margin time. The calculated time period can be used as a new deadline time period when a message to be relayed is transmitted. In the illustrated example, assuming that the time required for the internal processing by the gateway 4 is 0, the processor 41 of the gateway 4 receiving the message at the time t2 requests the CAN controller 23 to transmit this message at the time t2. Thus, the propagated deadline time period is a time period from the time t2 to the deadline time td.

The processor 41 of the gateway 4 according to Embodiment 2 provides a reception message from one of the CAN controllers 23 to another one of the CAN controllers 23 as a transmission message. At this time, the processor 41 sets a new deadline time period calculated from the margin time stored in the received message to the deadline holding register 31*a* of another one of the CAN controllers 23 to request for transmission of a message. The CAN controller 23 having received the transmission request performs message transmission processing and arbitration processing by the processor 41 using the deadline time period newly set to the deadline holding register 31*a*. The message transmission processing and the arbitration processing that are performed here are similar to the above-described processing performed by the CAN controller 23 of the ECU 2.

It is noted that the gateway 4 may be selectable as to whether the margin time of the received message is to be propagated to the message to be relayed. For example, the gateway 4 may have stored in the storage 42 the setting as to whether the margin time is to be propagated or not for each CAN ID of a message. If the margin time is not to be propagated, the gateway 4 sets a new deadline time period to a message to be relayed. Even if the margin time is to be propagated, the gateway 4 may decide a new deadline time period by suitably adding or subtracting some time period to and from the margin time obtained from the received message.

In the illustrated example, a message transmission by the gateway 4 is performed at the time t3 after a lapse of the standby time of some extent from the transmission request time t2. This message transmission is ended at the time t4 after a lapse of a predetermined transmission time that depends on the message length. At this time, the margin time stored in the arbitration field of the message is a time period from the time t3 to the deadline time td.

For the ECU 2 of the communication system according to Embodiment 2, the CAN controller 23 performs a message transmission using the deadline time period initially set by the processor 21 in the deadline holding register 31*a*. In contrast thereto, for the gateway 4, the processor 21 calculates a deadline time period every time the processor 21 relays a message and sets the calculated deadline time period to the deadline holding register 31*a* to thereby request the CAN controller 23 to transmit the message. The CAN controller 23 of the gateway 4 performs a message transmission by using the deadline time period set each time.

Figure 12:
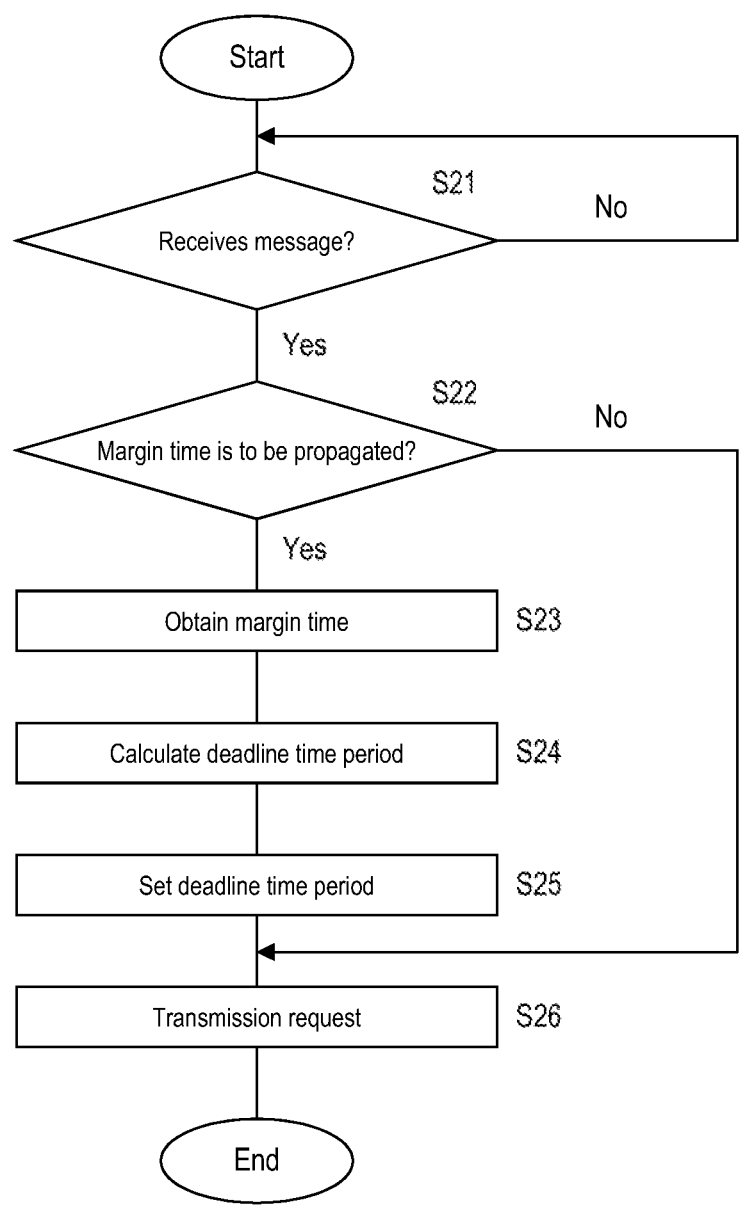
FIG. 12 is a flowchart showing message relay processing performed by the gateway according to Embodiment 2.

FIG. 12 is a flowchart showing message relay processing performed by the gateway 4 according to Embodiment 2. The processor 41 of the gateway 4 according to Embodiment 2 determines whether any one of the CAN controllers 23 receives a message (step S21). If no message is received (S21: NO), the processor 41 is held on standby before any one of the CAN controllers 23 receives a message.

If a message is received by any one of the CAN controllers 23 (S21: YES), the processor 41 determines whether or not a margin time attached to the received message is to be propagated when relaying the received message (step S22). Whether or not the margin time is to be propagated or not is determined based on the CAN ID attached to the reception message, for example. If the margin time is not to be propagated (S22: NO), the processor 41 sets a message to be relayed to the message holding register 31*b* of the CAN controller 23 as a destination to be relayed to provide a transmission request for this message (step S26) and ends the processing.

If the margin time is to be propagated (S22: YES), the processor 41 obtains the information related to the margin time stored in the arbitration field of the received message (step S23). The processor 41 calculates a new deadline time period based on the obtained margin time, the time required for the transmission of this message and the time required for the internal processing by the gateway 4 (step S24). The processor 41 sets the calculated deadline time period to the deadline holding register 31*a* of a CAN controller 23 different from the CAN controller 23 having received the message (step S25). The processor 41 sets a message to be relayed to the message holding register 31*b* of this CAN controller 23 to provide a transmission request for this message (step S26) and ends the processing.

In the communication system according to Embodiment 2 having the configuration described above, the gateway 4 to which the multiple CAN buses 3 are connected performs message relay processing of transmitting a message received from one of the CAN buses 3 to another one of the CAN buses 3. The gateway 4 obtains the information related to the margin time stored in the arbitration field of the received message. The gateway 4 calculates a deadline time period to be used when relaying the message based on the margin time obtained from the received message. The gateway 4 calculates a margin time of the message to be transmitted by relaying based on the calculated deadline time period. Hence, in the communication system according to Embodiment 2, when relaying a message, the gateway 4 can perform the message transmission processing and the arbitration processing by propagating the deadline time period and the margin time of the message.

The other configuration of the communication system according to Embodiment 2 is similar to that of the communication system according to Embodiment 1, and thus similar components are denoted by the same reference codes and detailed description is not made here.

Each device in the present system is provided with a computer composed of a microprocessor, a ROM, a RAM and the like. The computational processing unit in the microprocessor or the like may read out a computer program including a sequence diagram or a part or all of the steps of the flowchart as shown in FIGS. 9 to 12, from the storage unit such as the ROM, the RAM and the like. and execute the program. The computer programs for these multiple devices can be installed from an external server device or the like. The computer programs for these multiple devices are circulated while being stored in a recording medium such as a CD-ROM, a DVD-ROM, a semiconductor memory or the like.

It is to be understood that the embodiments disclosed here is illustrative in all respects and not restrictive. The scope of the present invention is defined by the appended claims, and all changes that fall within the meanings and the bounds of the claims, or equivalence of such meanings and bounds are intended to be embraced by the claims.

The invention claimed is:

1. A communication device transmitting and receiving a message to and from another device connected to a common communication line, comprising:

a processor; and a communication controller that includes a calculation unit that calculates as to a message to be transmitted a margin time before a time when a transmission of the message is to be completed, the margin time as being a time from a transmission start time of a message to a deadline time, a transmission unit that transmits the message to which information related to the margin time calculated by the calculation unit is attached, an arbitration unit that performs arbitration based on the information attached to the message when simultaneous message transmissions to the communication line occur and a storage unit that stores information related to a time when a message transmission is to be completed, and that transmits and receives a message to and from the communication line according to processing performed by the processor, wherein:

the processor writes information related to a time in the storage unit of the communication controller, the calculation unit, if a transmission request for a message is provided from the processor, reads the information related to the time from the storage unit and calculates the margin time based on a time point when the transmission request is provided and the information read from the storage unit, and as to a plurality of messages simultaneously transmitted to the communication line, the arbitration unit performs arbitration in such a manner as to prioritize a message with a shorter margin time.

2. The communication device according to claim 1, wherein the transmission unit transmits the message to which information related to the margin time calculated by the calculation unit and identification information for identifying the message or identification information for identifying a device are attached.

3. The communication device according to claim 1, wherein the message is a message in compliance with a communication standard of the Controller Area Network (CAN), and the transmission unit transmits a CAN message with the information related to the margin time stored in an arbitration field of the CAN message.

4. The communication device according to claim 1, the communication device being connected to a plurality of communication lines, further comprising:

a relay unit that is connected to a plurality of communication lines and performs processing of transmitting a message received from one of the communication lines to another one of the communication lines; and an obtainment unit that obtains information related to the margin time attached to the message received from the one of the communication lines, wherein the calculation unit calculates a margin time of a message to be relayed based on the information obtained by the obtainment unit.

5. The communication device according to claim 1, wherein the transmission unit transmits a message to which any one of information related to the margin time calculated by the calculation unit and identification information statically decided for the message is selectively attached as information for arbitration performed by the arbitration unit.

6. The communication device according to claim 2, wherein the message is a message in compliance with a communication standard of the Controller Area Network (CAN), and the transmission unit transmits a CAN message with the information related to the margin time stored in an arbitration field of the CAN message.

7. The communication device according to claim 2, the communication device being connected to a plurality of communication lines, further comprising:

a relay unit that is connected to a plurality of communication lines and performs processing of transmitting a message received from one of the communication lines to another one of the communication lines; and an obtainment unit that obtains information related to the margin time attached to the message received from the one of the communication lines, wherein the calculation unit calculates a margin time of a message to be relayed based on the information obtained by the obtainment unit.

8. The communication device according to claim 3, the communication device being connected to a plurality of communication lines, further comprising:

a relay unit that is connected to a plurality of communication lines and performs processing of transmitting a message received from one of the communication lines to another one of the communication lines; and an obtainment unit that obtains information related to the margin time attached to the message received from the one of the communication lines, wherein the calculation unit calculates a margin time of a message to be relayed based on the information obtained by the obtainment unit.

9. The communication device according to claim 2, wherein the transmission unit transmits a message to which any one of information related to the margin time calculated by the calculation unit and identification information statically decided for the message is selectively attached as information for arbitration performed by the arbitration unit.

10. The communication device according to claim 3, wherein the transmission unit transmits a message to which any one of information related to the margin time calculated by the calculation unit and identification information statically decided for the message is selectively attached as information for arbitration performed by the arbitration unit.

11. The communication device according to claim 4, wherein the transmission unit transmits a message to which any one of information related to the margin time calculated by the calculation unit and identification information statically decided for the message is selectively attached as information for arbitration performed by the arbitration unit.

12. A communication system in which a plurality of communication devices connected to a common communication line transmit and receive messages, each of the communication devices comprising:

a processor; and a communication controller that includes a calculation unit that calculates as to a message to be transmitted a margin time before a time when a transmission of the message is to be completed, the margin time as being a time from a transmission start time of a message to a deadline time, a transmission unit that transmits the message to which information related to the margin time calculated by the calculation unit is attached, an arbitration unit that performs arbitration based on the information attached to the message when simultaneous message transmissions to the communication line occur and a storage unit that stores information related to a time when a message transmission is to be completed, and that transmits and receives a message to and from the communication line according to processing performed by the processor, wherein the processor writes information related to a time in the storage unit of the communication controller, the calculation unit, if a transmission request for a message is provided from the processor, reads the information related to the time from the storage unit and calculates the margin time based on a time point when the transmission request is provided and the information read from the storage unit, and as to a plurality of messages simultaneously transmitted to the communication line, the arbitration unit performs arbitration in such a manner as to prioritize a message with a shorter margin time.

13. The communication system according to claim 12, wherein the transmission unit transmits, if a transmission of a message fails, the message again after a lapse of a predetermined standby time, and a different time is set as the standby time for each of the communication devices.

14. The communication system according to claim 12, wherein the plurality of communication devices include a communication device that provides a message with information related to the margin time as information used for arbitration performed by the arbitration unit, and a communication device that provides a message with identification information statically decided for the message as information used for arbitration performed by the arbitration unit.

15. A message arbitration method performing arbitration when simultaneous message transmissions by a plurality of communication devices connected to a common communication line occur, each of the communication devices comprising:

a processor; and a communication controller that includes a calculation unit that calculates as to a message to be transmitted a margin time before a time when a transmission of the message is to be completed, the margin time as being a time from a transmission start time of a message to a deadline time, a transmission unit that transmits the message to which information related to the margin time calculated by the calculation unit is attached, an arbitration unit that performs arbitration based on the information attached to the message when simultaneous message transmissions to the communication line occur and a storage unit that stores information related to a time when a message transmission is to be completed, and that transmits and receives a message to and from the communication line according to processing performed by the processor, wherein the processor writes information related to a time in the storage unit of the communication controller, the calculation unit, if a transmission request for a message is provided from the processor, reads the information related to the time from the storage unit and calculates the margin time based on a time point when the transmission request is provided and the information read from the storage unit, and as to a plurality of messages simultaneously transmitted to the communication line, the arbitration unit performs arbitration in such a manner as to prioritize a message with a shorter margin time.

16. The communication system according to claim 13, wherein the plurality of communication devices include a communication device that provides a message with information related to the margin time as information used for arbitration performed by the arbitration unit, and a communication device that provides a message with identification information statically decided for the message as information used for arbitration performed by the arbitration unit.

* * * * *